(12) United States Patent
Kohler, III

(10) Patent No.: US 12,396,408 B2
(45) Date of Patent: Aug. 26, 2025

(54) ROOT BARRIER BRACKET SYSTEM

(71) Applicant: CHESTER COUNTY BAMBOO LLC, Malvern, PA (US)

(72) Inventor: John J. Kohler, III, Malvern, PA (US)

(73) Assignee: Chester County Bamboo LLC, Malvern, PA (US)

( * ) Notice: Subject to any disclaimer, the term of this patent is extended or adjusted under 35 U.S.C. 154(b) by 2 days.

(21) Appl. No.: 18/475,680

(22) Filed: Sep. 27, 2023

(65) Prior Publication Data
US 2025/0098601 A1 Mar. 27, 2025

(51) Int. Cl.
*A01G 13/27* (2025.01)
*A01G 9/28* (2018.01)

(52) U.S. Cl.
CPC ............... *A01G 13/27* (2025.01); *A01G 9/28* (2018.02)

(58) Field of Classification Search
CPC ............ A01G 13/0237; A01G 13/0225; A01G 13/0243; A01G 9/28
See application file for complete search history.

(56) References Cited

U.S. PATENT DOCUMENTS

| | | | |
|---|---|---|---|
| 1,175,168 A * | 3/1916 | Moulton | E02D 5/08 405/279 |
| 1,204,044 A * | 11/1916 | McFaddin | F21V 17/00 362/453 |
| 3,495,352 A * | 2/1970 | Sbare | A01G 9/28 47/33 |
| 4,019,279 A | 4/1977 | Moorman et al. | |
| 4,429,489 A * | 2/1984 | Fischer | A01G 9/20 47/17 |
| 4,995,191 A | 2/1991 | Davis | |
| D352,871 S | 11/1994 | Miller et al. | |
| 5,465,526 A * | 11/1995 | Langley | A01G 9/28 47/33 |
| 5,477,639 A | 12/1995 | Smith | |
| 5,615,517 A | 4/1997 | Smith | |
| 6,021,600 A * | 2/2000 | Everett | A01G 9/28 47/33 |
| 6,299,118 B1 * | 10/2001 | Farrell | A01G 9/024 248/323 |
| 9,313,956 B2 * | 4/2016 | Volin | A01G 9/28 |
| 2006/0150479 A1 * | 7/2006 | Saunders | F21V 21/34 47/33 |
| 2007/0001088 A1 * | 1/2007 | Bowman | A47G 7/047 248/690 |
| 2007/0266626 A1 | 11/2007 | Dworzan | |
| 2019/0307085 A1 * | 10/2019 | Sowers | A01G 13/0237 |

* cited by examiner

*Primary Examiner* — Ebony E Evans
(74) *Attorney, Agent, or Firm* — Saxton & Stump, LLC

(57) ABSTRACT

A bracket system for joining a first root barrier material segment to a second root barrier material segment, root barrier system and a method of installing a root barrier system with the bracket system. The bracket system includes a first bracket element having a hook feature and a second bracket element having a retention feature arranged and disposed to receive the hook feature. The hook feature of the first bracket element engages the retention feature of the second bracket element to inhibit disengagement.

14 Claims, 3 Drawing Sheets

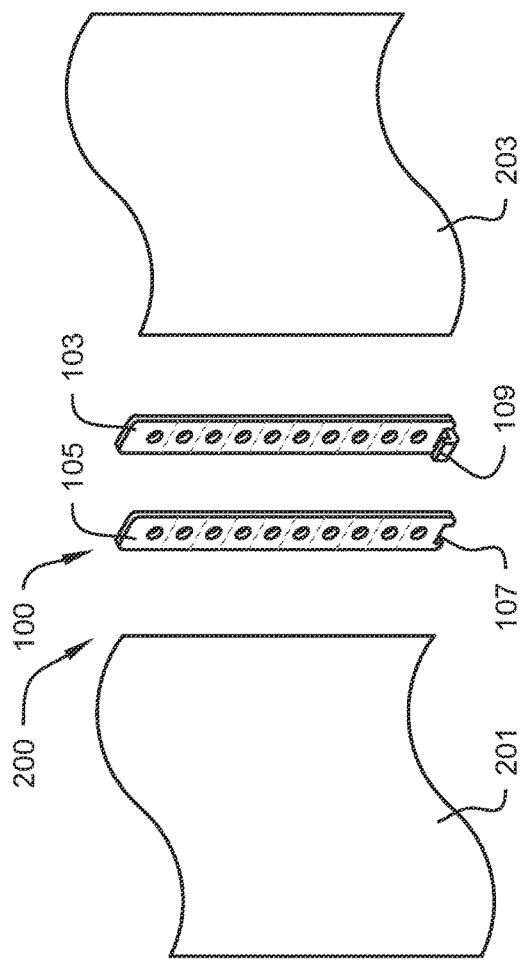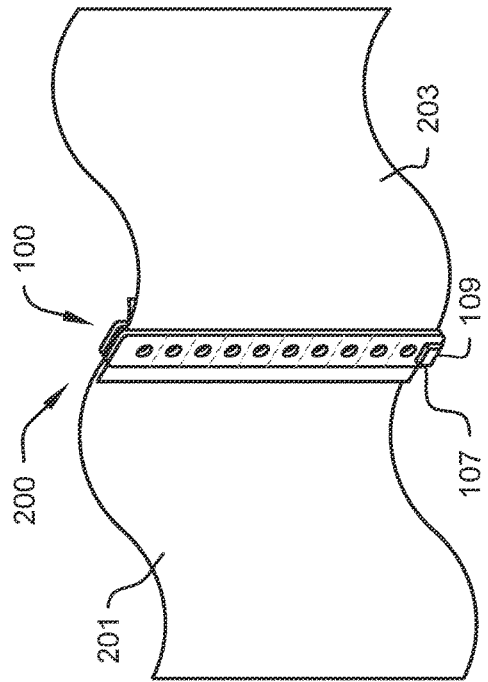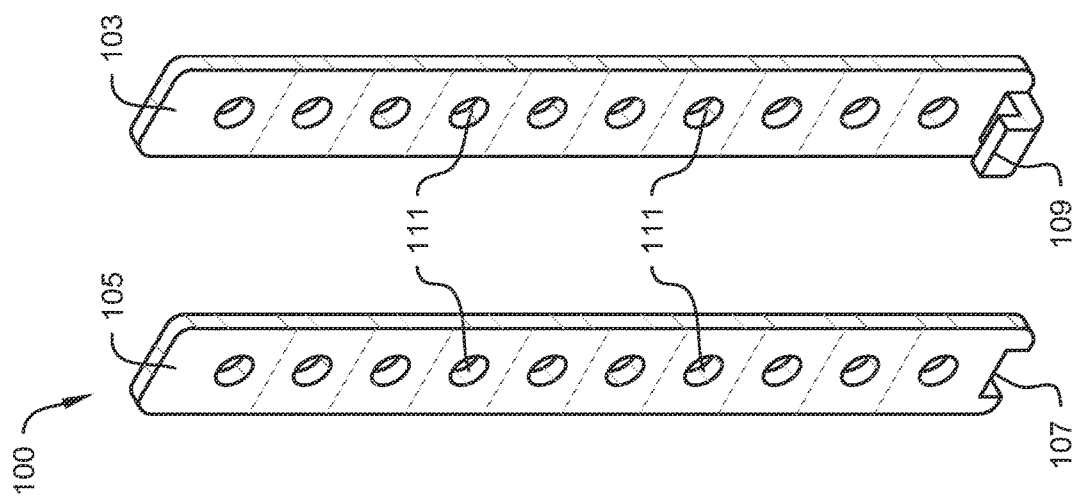

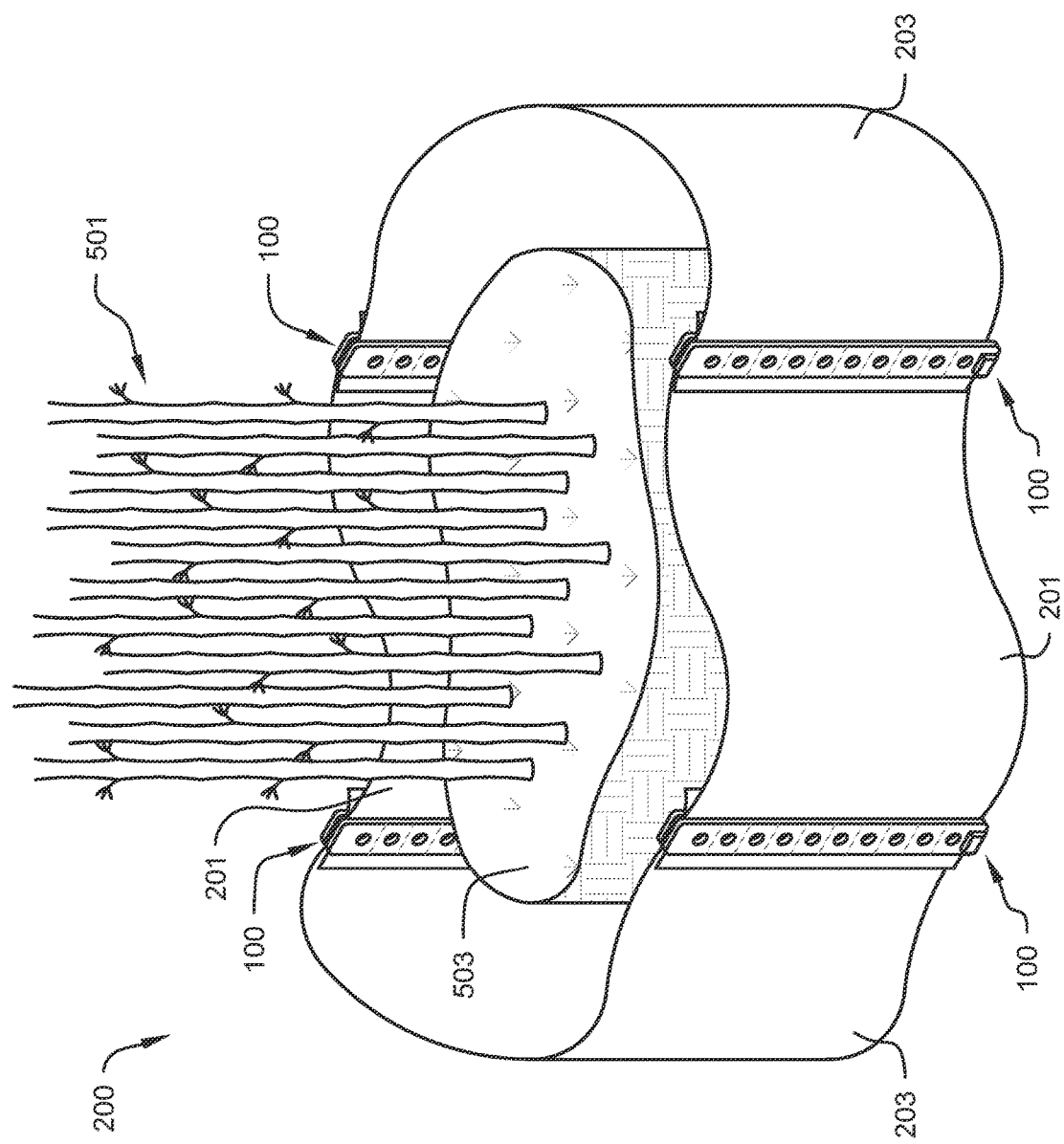

ROOT BARRIER BRACKET SYSTEM

FIELD OF THE INVENTION

The present disclosure is generally directed to a root barrier bracket system for containing root systems of plants.

BACKGROUND OF THE INVENTION

Root barrier systems are utilized to contain or control the growth of roots from plants, particularly for plants that are invasive or fast growing. Root barrier systems may also be utilized to segregate different types of plants and provide containment. Plants, such as bamboo, form rhizomes and roots that can spread invasively deep in the ground or outwardly from the plant. Therefore, it is important to be able to contain such rhizomes and roots.

A drawback of existing root barrier systems is an inherent weakness at the connection line between barrier segments. Current root barrier systems include bracket or clip systems for joining root barrier segments are difficult to install and do not provide sufficient containment of root systems of plants. Known connectors include clips to hold the opposite edges of the barrier panels. In this system, as outward growth of roots begins to press against the barrier segments, the connection of the clips weakens forming openings in the barrier, allowing roots to grow through the barrier. Other systems include bracket materials that are fabricated from a flexible material that makes installation more difficult and causes opportunities for failure, particularly at locations where fasteners are installed. Still other bracket systems, while rigid, lack ease of installation due to difficult handling of the components, particularly in excavated areas, resulting in misalignment and potential loss of integrity of the barrier material. For example, if an accidental hole is put in the barrier material it is compromised and the plant's rhizomes and/or roots may be permitted to undesirably spread.

What is needed is a root barrier system that does not suffer from the drawbacks of the prior art. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The application generally related to a bracket system for joining a first root barrier material segment to a second root barrier material segment, a root barrier system, and a method of installing a root barrier system utilizing the bracket system. The bracket system includes a first bracket element and a second bracket element having features arranged and disposed to receive each other to inhibit disengagement during installation.

One embodiment of the present disclosure is directed to a bracket system for joining a first root barrier material segment to a second root barrier material segment. The bracket system includes a first bracket element having a hook feature and a second bracket element having a retention feature arranged and disposed to receive the hook feature. The hook feature of the first bracket element engages the retention feature of the second bracket element to inhibit disengagement.

Another embodiment of the present disclosure is directed to a root barrier system. The root barrier system includes a first root barrier material segment, a second root barrier material segment, and a bracket system for joining the first root barrier material segment to the second root barrier material segment. The bracket system includes a first bracket element having a hook feature, and a second bracket element having a retention feature to receive the hook feature. The hook feature of the first bracket element engages the retention feature of the second bracket element to inhibit disengagement and the first bracket element and the second bracket element engage the first root barrier material segment and the second root barrier material segment.

Another embodiment of the present disclosure is directed to a method for installing a bracket system for a root barrier system. The method includes providing a first root barrier material segment and a second root barrier material segment. A bracket system including a first bracket element having a hook feature and a second bracket having a retention feature to receive the hook feature is provided. The first bracket element is positioned and the first root barrier material segment and the second root barrier material segment adjacent the first bracket element. The second bracket element is directed into engagement with the first bracket element. A fastener is directed through the first bracket element and the second bracket element to join the first root barrier material segment and the second root barrier material segment.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

FIG. 1 illustrates a bracket system according to an embodiment of the present disclosure.

FIG. 2 illustrates a disassembled root barrier system according to an embodiment of the present disclosure.

FIG. 3 illustrates an assembled root barrier system according to an embodiment of the present disclosure.

FIG. 5 illustrates a root barrier system installed around a plant cluster according to an embodiment of the present disclosure.

Wherever possible, the same reference numbers will be used throughout the drawings to represent the same parts.

DETAILED DESCRIPTION OF THE INVENTION

Figure 4:
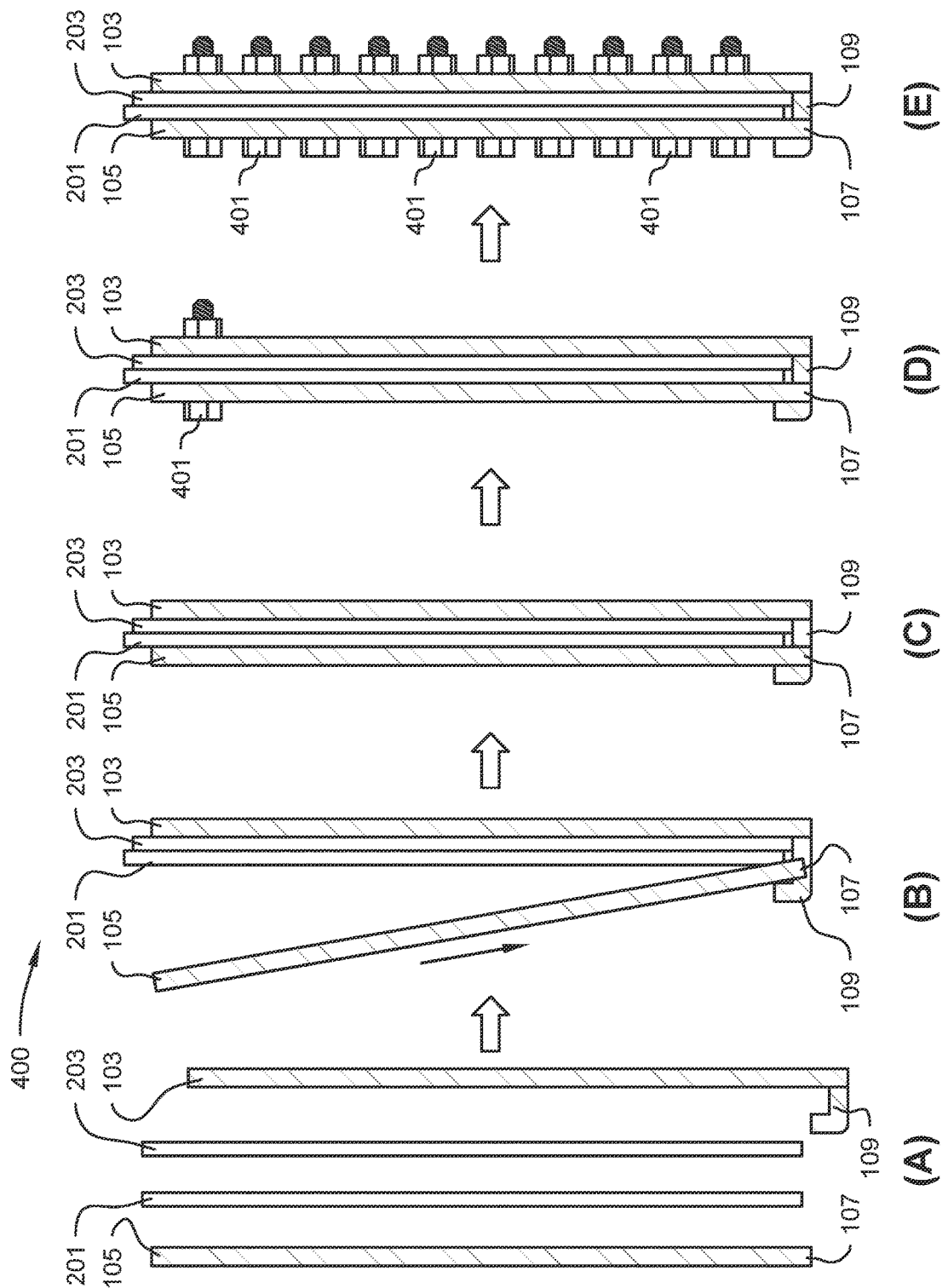
FIG. 4 illustrates a method of installing a bracket system according to an embodiment of the present disclosure.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a protective barrier to contain plant rhizomes and roots to a desired area. The bracket elements according to the present disclosure may be formed, such as by laser cutting or machining, with rounded edges for safety of the installer and to reduce the opportunity for sharp edges to compromise the root barrier material segment. The present invention is resistant to rusting or corroding underground. Certain embodiments of the bracket elements are constructed of heavy gauge stainless steel making the bracket elements extremely strong and corrosion resistant. The present invention is easy to handle and assemble and has a long lifetime.

FIG. 1 shows a bracket system 100 according to an embodiment of the present disclosure for connecting root barrier material segments. The bracket system 100 includes a first bracket element 103 having a hook feature 109 and a second bracket element 105 having a retention feature 107 arranged and disposed to receive the hook feature 109 of the first bracket element 103. The hook feature 109 engages the retention feature 107 to inhibit disengagement. By inhibit disengagement, inhibiting disengagement, and grammatical variations thereof, as utilized herein, it is meant that the engagement is such that movement between the first bracket element 103 and the second bracket element 105 is restricted and the first bracket element 103 and the second bracket element 105 remain engaged and immobile or nearly immobile at least one point through a range of relative motion. For example, the first bracket element 103 and the second bracket element 105 may be engaged at the hook feature 109 and retention feature 107 and the first bracket element 103 and the second bracket element 105 may pivot with respect to one another but remaining engaged together at the hook feature 109 and retention feature 107. The first bracket element 103 and the second bracket element 105 may be fabricated from any suitable material capable of withstanding soil conditions. For example, the first bracket element 103 and the second bracket element 105 may be fabricated from stainless steel. Suitable bracket elements may have a geometry including a width of from about 1.5 inches to about 2.5 inches. Suitable widths include a thickness of from about ⅛ inch to about ¼ inch. Suitable lengths for the bracket elements include from 12 inches to 36 inches long. One particularly suitable geometry includes a bracket element that is 2 inches wide, ⅛ inches thick and 30 inches long. Suitable materials to fabricate the bracket elements include stainless steel, such as 304 or 316 grade stainless steel. In one particularly suitable embodiment, the bracket elements are fabricated from 3042b, stainless steel. In still another embodiment, such as in salty environments, the bracket element may be fabricated from 316 stainless steel. The first bracket element 103 and the second bracket element 105 may be formed by any suitable technique, including, but not limited to laser cutting, machining, casting, or any other suitable forming technique. In one embodiment, the bracket elements may be rounded at the corners to prevent cutting hazard of both the installer and the root barrier material.

While the engagement of the hook feature 109 and the retention feature 107 inhibits disengagement, the hook feature 109 and the retention feature 107 may be disengaged by movement upward in a direction parallel or near parallel to an axis along the length of the first bracket element 103 or in a direction opposite the direction to which the first bracket element 103 and the second bracket element 105 were engaged. In the embodiment shown in FIG. 1, each of the first bracket element 103 and the second bracket element 105 include openings 111. Opening 111 have a geometry suitable for permit passage of fasteners to connect the first bracket element 103 to the second bracket element 105. For example, in one embodiment, the openings 111 may have a sufficient diameter to receive 5/16 inch diameter bolts. The particular number of openings 111 is not particularly limited and may include any suitable number of openings 111 for connecting the first bracket element 103 to the second bracket element 105. Upon engagement of the hook feature 109 and the retention feature 107, the position of openings 111 for each of the first bracket element 103 to the second bracket element 105 are in alignment such that the openings permit passage through both the opening 111 in the first bracket element 103 and the opening 111 in the second bracket element 105.

FIG. 2 shows a disassembled view of a root barrier system 200 according to an embodiment of the present disclosure. An assembled root barrier system 200 is shown in FIG. 3. The root barrier system 200 includes a first root barrier material segment 201 and a second root barrier material segment 203. The first root barrier material segment 201 and the second root barrier material segment 203 may include any suitable materials for installation as a root barrier. Examples of materials for the first root barrier material segment 201 and the second root barrier material segment 203 include, but are not limited to plastic sheets, rubber sheets, landscape fabric, fiberglass, resin tiered graphite laminates, permeable mesh or other materials capable of containing plant root growth. Suitable plastic material my include long-lasting plastic materials such as molded and extruded materials such as polyvinyl chloride (PVC), polyethylene, polystyrene, and polypropylene. In one embodiment, the material for use as the first root barrier material segment 201 and the second root barrier material segment 203 may be fabricated from 40 to 100 mil polypropylene. In one embodiment, the first root barrier material segment 201 and/or the second root barrier material segment 203 may be fabricated from high density polyethylene (HDPE). The first root barrier material segment 201 and the second root barrier material segment 203 may be the same material or may be different materials. The first root barrier material segment 201 and the second root barrier material segment 203 may be formed by any suitable technique including, but not limited to casting, extruding or injection molding to form sheet material of any length and size desired.

The root barrier system 200, as shown in FIG. 2, includes a bracket system 100 for joining the first root barrier material segment 201 to the second root barrier material segment 203. As shown and described with respect to FIG. 1, bracket system 100 includes a first bracket element 103 having a hook feature 109 and a second bracket element 105 having a retention feature 107 arranged and disposed to receive the hook feature 109 of the first bracket element 103. The hook feature 109 engages the retention feature 107 to inhibit disengagement. As shown in FIG. 3, the first bracket element 103 and the second bracket element 105 are positioned on overlapping sections of the first root barrier material segment 201 and the second root barrier material segment 203 and fastened by any suitable fasteners 401 (see for example FIG. 4). A suitable range for overlap the first root barrier material segment 201 and the second root barrier material segment 203 may be from less than 12 inches or from about 1 inch to about 6 inches. In one embodiment, the overlap is sufficiently large to permit capture of material, but sufficiently small so as to prevent the root system from creating a wedge, putting excessive pressure on the root barrier material segment and bracket element.

FIG. 4 schematically illustrates a method 400 for installing a root barrier system 200 according to an embodiment of the present disclosure. Method 400 includes providing a first root barrier material segment 201, a second root barrier material segment 203 and a bracket system 100 including a first bracket element 103 having a hook feature 109 and a second bracket element 105 having a retention feature 107 to receive the hook feature 109 (step A). Method 400 further includes positioning the second bracket element 105 and positioning the first root barrier material segment 201 and the second root barrier material segment 203 adjacent the first bracket element 103 (step B). The positioning of the second bracket element 105 includes directing the retention feature 107 of the second bracket element 105 onto and in engagement with the hook feature 109 of the first bracket element 103. Thereafter, the second bracket element 105 is directed into engagement with the first bracket element 103 (step C). The engagement of the first bracket element 103 and the second bracket element 105 in this step includes engagement of the retention feature 107 with the hook feature 109 and engagement of positioning the first bracket element 103 and the second bracket element 105 parallel to one another around the first root barrier material segment 201 and the second root barrier material segment 203. A fastener 401 is directed through openings 111 (see for example, FIG. 1) in both the first bracket element 103 and the second bracket element 105 and secured (step D). In advance of the fastener 401 being directed, the openings 111 may be pre-drilled to permit the fastener 401 to pass through the first root barrier material segment 201 and the second root barrier material segment 203. The fastener 401 in this step is preferably a fastener at or near the end of the first bracket element 103 and the second bracket element 105 distal to the retention feature 107 and hook feature 109 (e.g., at the top of the bracket system 100). In one embodiment, the upper fastener 401 is installed first in order to align the first bracket element 103 and the second bracket element 105 from the top. The upper fastener 401 secures the top as the hook feature 109 and retention feature 107 assists to hold the lower portions of the hook feature 109 and retention feature 107 in place. Once the bottom fastener 401 is installed the bracket is locked at both ends. The installer can then drill and secure the remaining fasteners 401 without concern of any movement or misalignment of the root barrier material segments and bracket elements. Fastener 401 may include any suitable fastener for connecting the first bracket element 103 to the second bracket element 105 and is capable of withstanding soil conditions. Suitable fasteners include, but are not limited to bolts or other connecting fasteners. Materials for fastener 401 may include any suitable material, such as stainless steel. In one particularly suitable embodiment, fastener 401 is fabricated from stainless steel and of suitable diameter to withstand the pressure placed on the bracket over time by the environment. After the first fastener 401 is installed, additional fasteners 401 are directed through the openings 111 in the first bracket element 103 and the second bracket element 105 to join the first root barrier material segment 201 and the second root barrier material segment 203 (step E).

FIG. 5 shows a root barrier system 200 installed around a plant cluster 501 planted in soil 503. Plant cluster 501 may be any plant or agricultural product that produces roots. Examples of plants present in plant cluster 501 may include bamboo. Bamboo is a grass belonging to the Poaceae family. Bamboo is among the subfamily Bambusoideae, having three tribes; Arundinarieae, Bambuseae & Olyreae. The root barrier system 200 according to the present disclosure is suitable for use with tribe Bambuseae, including but not limited to the genus *Phyllostachys, Pseudosasa, Plieoblastus, Semiarundinaria* & *Sasa*. In addition, the root barrier system 200 according to the present disclosure may be utilized with *Rhys Sorbia* and *Itea*. As shown in FIG. 5, the root barrier system 200 includes two first root barrier material segments 201 and two second root barrier material segments 203. The invention is not limited to any specific number of barrier material segments. Although the root barrier system 200 has been described with two barrier material segments (see FIG. 3) or four barrier material segments (see FIG. 5), the disclosure is not so limited and any number of barrier material segments requiring connection may be utilized with the root barrier system 200 according to the present disclosure. The first root barrier material segments 201 and second root barrier material segments 203 are connected by bracket system 100 at each junction of first root barrier material segment 201 and second root barrier material segment 203. As shown in FIG. 5, the first root barrier material segments 201 and second root barrier material segments 203 surround plant cluster 501. The soil 503 is typically excavated to permit insertion of the elements of the root barrier system 200. After installation of the root barrier system 200, additional soil 503 may be back-filled to bury the root barrier system 200. Suitable depths for the root barrier system 200 includes, but is not limited to 12 inches, 24 inches, 30 inches or 36 inches. In addition, the root barrier system 200 includes a lip above grade with a height sufficient to reduce or eliminate the ability of the roots or rhizomes from jumping over the root barrier system 200. Suitable lip heights for the root barrier systems 200 may include about 2 inches to 3 inches above grade.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:
1. A root barrier system comprising:
a first root barrier material segment;
a second root barrier material segment; and
a bracket system for joining the first root barrier material segment to the second root barrier material segment, the bracket system comprising:
a first bracket element having a hook feature positioned at an end of the first bracket element;

a second bracket element having a retention feature positioned at an end of the second bracket element to receive the hook feature;

wherein the hook feature of the first bracket element engages the retention feature of the second bracket element to inhibit disengagement, the first bracket element and the second bracket element engage the first root barrier material segment and the second root barrier material segment, and, prior to fastening the first bracket element to the second bracket element, the engaging permits pivoting of the second bracket element with respect to the first bracket element while remaining engaged.

2. The root barrier system of claim 1, further comprising at least one opening in each of the first bracket element and the second bracket element.

3. The root barrier system of claim 2, wherein the at least one opening of the first bracket element aligns with at least one of the at least one openings of the second bracket element when the hook feature and retention feature are engaged.

4. The root barrier system of claim 1, wherein each of the first bracket element and the second bracket element are fabricated from stainless steel.

5. The root barrier system of claim 1, wherein each of the first root barrier material segment and the second root barrier material segment are fabricated from a material selected from the group consisting of polyvinyl chloride, polyethylene, polystyrene, and polypropylene.

6. The root barrier system of claim 1, wherein the root barrier system comprises a plurality of first root barrier material segments and second root barrier material segments.

7. The root barrier system of claim 1, wherein the root barrier system comprises a plurality of bracket systems.

8. A method for installing a root barrier system, the method comprising:
providing a first root barrier material segment and a second root barrier material segment;
providing a bracket system comprising:
a first bracket element having a hook feature positioned at an end of the first bracket element;
a second bracket element having a retention feature positioned at an end of the second bracket element to receive the hook feature;
positioning the first bracket element;
positioning the first root barrier material segment and the second root barrier material segment adjacent the first bracket element;
directing the second bracket element into engagement with the first bracket element, and, prior to fastening the first bracket element to the second bracket element, the engaging permits pivoting of the second bracket element with respect to the first bracket element while remaining engaged; and
directing a fastener through the first bracket element and the second bracket element to join the first root barrier material segment and the second root barrier material segment.

9. The method of claim 8, further comprising at least one opening in each of the first bracket element and the second bracket element.

10. The method of claim 9, wherein the at least one opening of the first bracket element aligns with at least one of the at least one openings of the second bracket element when the hook feature and retention feature are engaged.

11. The method of claim 8, wherein each of the first bracket element and the second bracket element are fabricated from stainless steel.

12. The method of claim 8, wherein each of the first root barrier material segment and the second root barrier material segment are fabricated from a material selected from the group consisting of polyvinyl chloride, polyethylene, polystyrene, and polypropylene.

13. The method of claim 8, wherein the root barrier system comprises a plurality of first root barrier material segments and second root barrier material segments.

14. The method of claim 8, wherein the root barrier system comprises a plurality of bracket systems.

* * * * *